United States Patent [19]

Hsu et al.

[11] Patent Number: 5,768,286
[45] Date of Patent: Jun. 16, 1998

[54] METHOD AND APPARATUS FOR TESTING THE READING RELIABILITY OF CD-ROM PLAYER

[75] Inventors: Robert Hsu; Juiho Chen, both of Taoyuan, Taiwan

[73] Assignee: Acer Peripherals, Inc., Taiwan

[21] Appl. No.: 704,838

[22] Filed: Aug. 28, 1996

[51] Int. Cl.$^6$ .................................................. G06F 11/10
[52] U.S. Cl. ........................................ 371/21.2; 395/183.2
[58] Field of Search ........................... 371/21.2, 40.1, 371/40.4, 37.5, 3, 20.4, 22.5, 24, 27.5, 40.2, 67.1; 369/32, 53, 275.3, 48; 360/53, 31; 395/182.03, 183.18, 180, 183.01, 183.02, 183.22, 188.01

[56] References Cited

U.S. PATENT DOCUMENTS

| | | | |
|---|---|---|---|
| 5,457,673 | 10/1995 | Nakamura et al. | 369/53 |
| 5,471,351 | 11/1995 | Ishiguro | 360/53 |
| 5,499,147 | 3/1996 | Tsai et al. | 360/53 |
| 5,499,224 | 3/1996 | Sanada | 369/48 |
| 5,499,252 | 3/1996 | Watanabe | 371/40.1 |
| 5,535,327 | 7/1996 | Verinsky et al. | 395/182.03 |
| 5,568,467 | 10/1996 | Inagaki et al. | 369/275.3 |

*Primary Examiner*—Robert W. Beausoliel, Jr.
*Assistant Examiner*—Nadeem Iqbal

[57] ABSTRACT

An alternative method for testing the reading reliability of a CD-ROM player is provided. The method is applicable to both the semi-complete CD-ROM player without final packing on the production line as well as the complete CD-ROM player. The method includes first step of writing a predetermined data onto a plurality of sectors of a sample CD-ROM. The sector has a sector address and the predetermined data is a one-to-one function of the sector address and is stored in the sample CD-ROM in a format which does not include an error detection code and an error correction code. The sample CD-ROM does not has an error of un-correctable type. The method includes step of generating the predetermined data by the host computer based on the function and comparing the predetermined data with the set of data output by a de-scrambler operation of the invention to evaluate the reading reliability of the CD-ROM player.

22 Claims, 3 Drawing Sheets

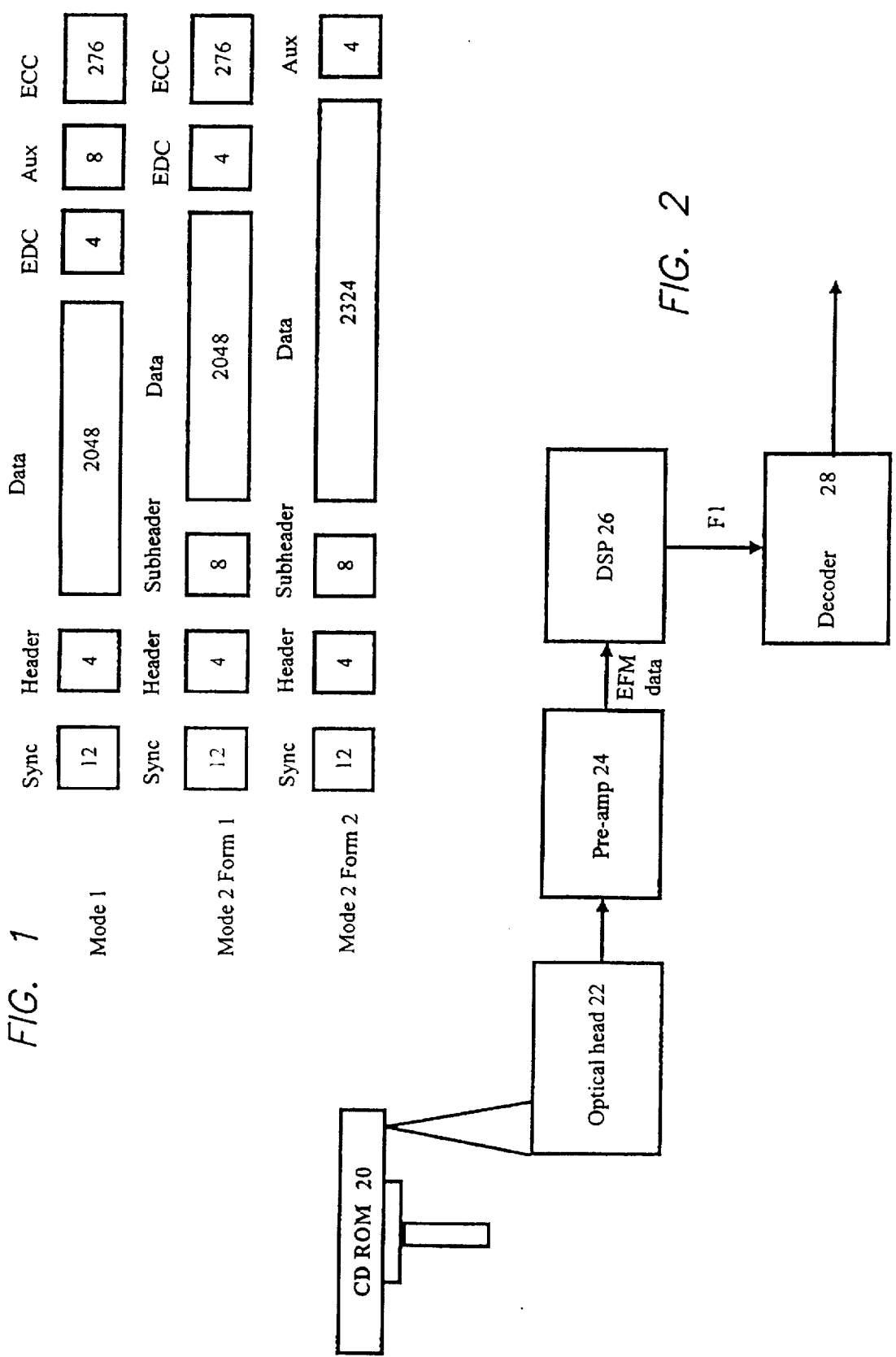

METHOD AND APPARATUS FOR TESTING THE READING RELIABILITY OF CD-ROM PLAYER

TECHNICAL FIELD OF INVENTION

The invention relates to the reading reliability of a CD-ROM player.

BACKGROUND OF INVENTION

The following technical information may be further referred to in order to have an in-depth understandings of the background and prior art technology regarding the invention.

1. International Standard ISO/IEC 10149, first edition, Sep. 1, 1989, Global Engineering Documents, Irvin, Calif. 92714, USA.

2. Small Form Factor Committee, Specification of ATA Packet Interface for CD-ROM's, SFF-8020, Revision 1.2, Feb. 24, 1994.

3. SCSI-2 draft proposed American National Standard, Revision 10c.

4. Red book, Compact Disc—Digital Audio(CD-DA), by Sony Corp. and N. V. Philips, April 1987.

5. Yellow book, Compact Disc—Read Only Memory (CD-ROM), by Sony Corp. and N. V. Philips, November 1988.

It is sometimes possible that a CD-ROM may suffer from a physical damage, e.g. scratch, during production or use. To avoid logical continuous data being lost resulting from the physical damage, during the data-write process of a CD-ROM production, data scramble technique is employed. In short, each logical continuous data is divided into a plurality of partitions according to a predetermined algorithm first. Afterwards, another algorithm is employed to scramble partitions of one logical continuous data with partitions of other logical continuous data. The resulting scrambled data are then sequentially and continuously written into the physical spaces of the CD-ROM. When, unfortunately, a certain portion of the CD-ROM is damaged, the portion of damage data belonging to one logical continuous data may be recovered by the associated un-damaged data of the respective logical continuous data via the algorithm. It is therefore, in addition to the raw data, some extra data including control code, sync code and protection code are added into the raw data to form a complete data in the CD-ROM.

As well known in the arts, each physical small frame of a CD-ROM has 588 channel bits in which the length of the F1 data frame is 24 bytes, and a sector on the disc consists of 98 small frames. Therefore, the F1 data frames within one sector occupy 2352 bytes of space.

As shown in FIG. 1, the logical format on one sector of the disc may be the MODE 1, MODE2 FORM1 or MODE2 FORM2. For each logical format , each sector includes 12-byte sync data for synchronizing read operation and 4-byte header data which indicate the physical address, logic format type, as well as the data code. The data code may include raw data, EDC, ECC or auxiliary codes depending on the format selected. As the logical format is MODE1 or MODE2 FORM1, the data code include error detecting code (EDC) and error correction code (ECC) for detecting and correcting correctable data errors.

The data reading, processing and outputting operations of small frame on CD-ROM 20 are disclosed in FIG. 2. The eight-to-fourteen modulated (EFM) data read by the optical head 22 are outputted to the pre-amplifier 24. The amplified EFM data are then outputted to the digital signal processor (DSP) 26. After signal processing, the DSP 26 outputs F1 frame data to the decoder 28.

As shown in FIG. 3, the DSP 26 performs the EFM demodulation operation 30 of the received data. The output of de-modulation operation 30 is the F3 frame data which has 33 bytes. Within the F3 frame, there is one control byte. The operation 32 retrieves this control byte and also outputs the residual 32 bytes of F2 frame data. The F2 frame data is then inputted to the cross interleaved reed-solemon code (CIRC) decoder 34 from which F1 frame data, c1 and c2 code are obtained. The c1 and c2 codes are used to indicates the correctness of the F1 frame data. In particular, c1 code indicates if correctable error exists in the F1 frame data and c2 code indicates if un-correctable error exists in the F1 frame data.

When a c2 type error does not exists while read operation of one CD-ROM player is performed, the reading reliability of the CD-ROM player is assured. The mathematical algorithm employed by CIRC decoder/encoder is conventional and may be referred to in the associated documents regarding the signal processing technology.

As shown in FIG. 4, the CD-ROM decoder 28, responsive to the instruction from application utility, selectively performs the de-scramble operation 40, error detection code operation and error correction code operation on the received F1 frame data of different data formats. When none of mentioned operations is performed, the output is the scrambled data in CD-DA format. When only descramble operation 40 is performed, the output is in MODE2 FORM2 format. When all mentioned operations are performed, the output is in either MODE1 or MODE2 FORM1 format.

During the final phase of manufacture of the CD-ROM player, the reading reliability of CD-ROM is one of the tests which must be performed. Conventionally, the c2 code output pin of the DSP 26 is monitored to decide if there exists a c2 type data error. However, this approach is not efficient with regard to the production cost and only applicable to semi-complete CD-ROM player without final packing.

SUMMARY OF INVENTION

The invention provides an alternative method for testing the reading reliability of a CD-ROM player. The method is applicable to both the semi-complete CD-ROM player without final packing on the production line and the complete CD-ROM player which requires maintenance. The method includes first step of writing a predetermined data onto a plurality of sectors of a sample CD-ROM. The sector has a sector address and the predetermined data is one-on-on function of the sector address and is stored in the sample CD-ROM in a format which does not include an error detection code and an error correction code. The sample CD-ROM does not have error of un-correctable type.

Secondly, the method includes step of storing the function in a host computer.

Thirdly, the method includes step of performing reading operation of the sample CD-ROM by the CD-ROM player and outputting a set of data to the host computer.

Fourthly, the method includes step of generating the predetermined data by the host computer based on the function and comparing the predetermined data with the set of data output by a de-scrambler operation of the invention to evaluate the reading reliability of the CD-ROM player.

BRIEF DESCRIPTIONS OF APPENDED DRAWINGS

FIG. 1 discloses typical data formats adopted by CD-ROM.

FIG. 2 shows the retrieve operations of the data on CD-ROM by CD-ROM player.

Figure 5:
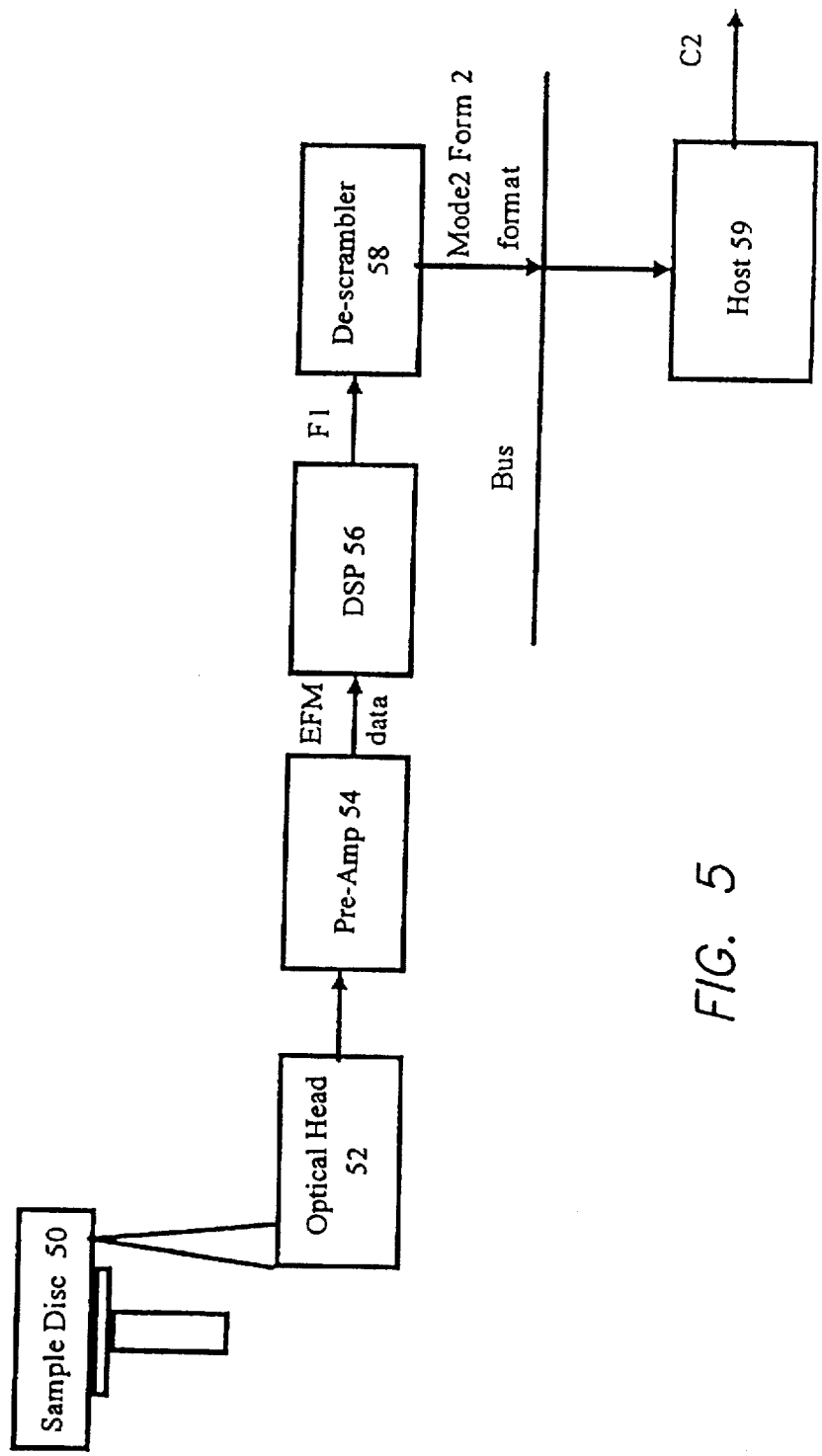

FIG. 5 discloses one preferred embodiment of the present invention.

DETAILED DESCRIPTIONS OF THE PREFERRED EMBODIMENT

Figure 3:
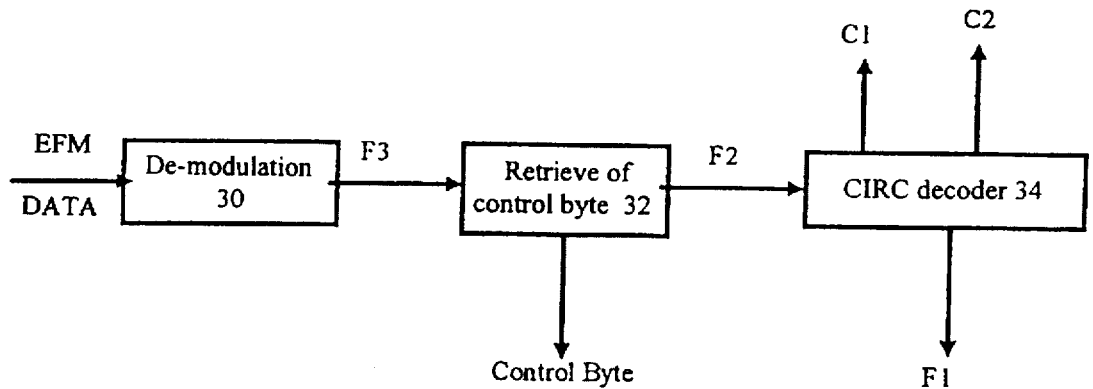
FIG. 3 shows the detailed operations in the digital signal processor.
Figure 4:
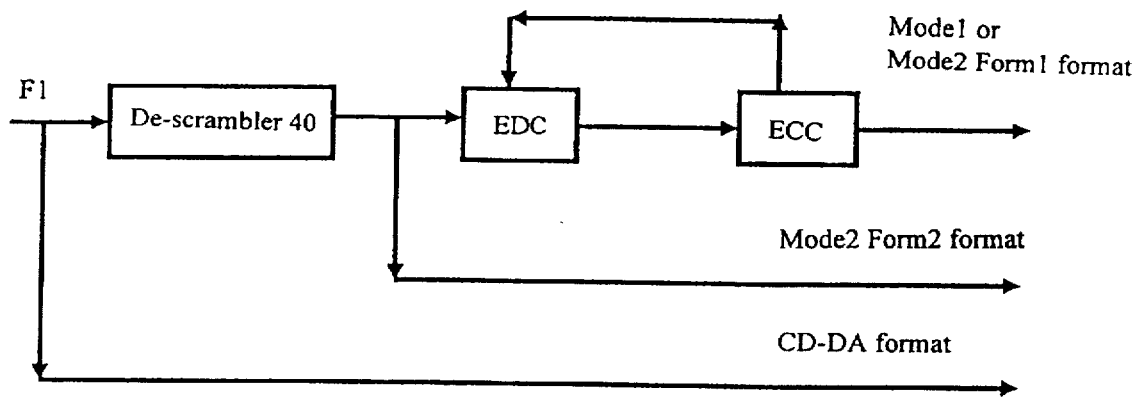
FIG. 4 shows the detailed operations in the CD-ROM decoder.

As mentioned above regarding FIG. 1 and FIG. 4, as the data output from the CD-ROM player is in form of format of MODE1 or MODE2 FORM1, the data does not contain information regarding the c2 type error of data as result of operations of EDC and ECC. As a result, this invention employs the logical format of MODE2 FORM2, which does not contain the EDC and ECC data, to store a predetermined sample data.

As shown in FIG. 5, the testing apparatus according to the invention includes a sample disc 50 which stores a predetermined data in MODE2 FORM2 format. Furthermore, verification has been made that the predetermined data are written into this sample disc 50 without c2 type data error. The predetermined data is an one-on-one function of the sector address, i.e. MSF address. In one embodiment, the predetermined data is a series of integer values and the integer values increase, at a constant difference, corresponding to increase of the sector address.

The optical head 52 of the CD-ROM player being tested first reads the data on the sample disc 50. The output of the optical head 52 then is inputted to the pre-amplifier 54. The amplified EFM data is then inputted to the DSP 56. The DSP 56 performs the conventional operations. Afterwards, the F1 frame data then inputted to the de-scrambler operation 58. The output of the descrambler operation 58 is in form of MODE2 FORM2 format.

As mentioned, the data in MODE2 FORM2 format contains information regarding c2 type error, if it does exist.

Via the bus, the set of data from the de-scrambler operation 58 are received by a host computer 59. The host computer 59 is provided to store either the function which correlates the predetermined data with the sector address, or the predetermined data per se. When the function is stored, the host computer 59 must generate the predetermined data based on the function before comparing the predetermined data with the set of data output from the de-scrambler operation 58.

When the comparison performed by the host computer 59 shows an identity between both data, no c2 type error is indicated which verifies the reading reliability of the tested CD-ROM player is in an acceptable condition. To the contrary, when the comparison shows a difference existing between both data, c2 type error is found which reveals a re-work or a further examination of the test CD-ROM player is necessary.

What is claimed is:

1. A method for testing the reading reliability of a CD-ROM player, comprising:

writing predetermined test data onto a plurality of sectors of a sample CD-ROM, each of the sectors having a respective sector address, the predetermined test data being derived from the sector addresses in accordance with a predetermined test function and being stored in the sample CD-ROM in a CD-ROM format which does not include any error detection code or any error correction code, the sample CD-ROM not having any uncorrectable error;

storing the predetermined test function in a host computer;

using the CD-ROM player to read the predetermined test data from the sample CD-ROM into the host computer to thereby generate a set of output data;

using the host computer to generate a second copy of the predetermined test data from the predetermined test function stored in the host computer; and using the host computer to compare the second copy of the predetermined test data with the set of output data to thereby evaluate the reading reliability of the CD-ROM player.

2. The method as recited in claim 1, wherein the predetermined test function is a one-to-one function.

3. The method as recited in claim 1, wherein the predetermined test data is a series of integer values, and each of the integer values increases at a constant difference corresponding to an increase of the respective sector address.

4. The method as recited in claim 1, wherein said CD-ROM format is MODE2 FORM2.

5. The method as recited in claim 1, wherein the host computer is a personal computer.

6. Apparatus for testing the reading reliability of a CD-ROM player, comprising:

a sample CD-ROM, predetermined test data being stored onto a plurality of sectors of the sample CD-ROM in a CD-ROM format which does not include any error detection code or any error correction code, the sample CD-ROM not having any un-correctable error, each sector having a respective sector address, the predetermined test data being derived from the sector addresses in accordance with a predetermined test function; and a testing bench adapted to receive a set of output data from the CD-ROM player, the testing bench comprising means for storing said predetermined test function; and microprocessor means for generating a second copy of the predetermined test data from said predetermined test function and for comparing the predetermined data with the set of output data to evaluate the reading reliability of the CD-ROM player.

7. The apparatus as recited in claim 6, wherein the function is a one-to-one function.

8. The apparatus as recited in claim 6, wherein the predetermined test data is a series of integer values, and each of the integer values increases at a constant difference corresponding to an increase of the respective sector address.

9. The apparatus as recited in claim 6, wherein the format is MODE2 FORM2.

10. The apparatus as recited in claim 6, wherein the testing bench is a personal computer, the storing means is a hard-disk, and the microprocessor means is a central processing unit of the personal computer.

11. A method for testing the reading reliability of a CD-ROM player, comprising writing predetermined test data onto a plurality of sectors into a sample CD-ROM, each of the sectors having a respective sector address, the predetermined test data being stored in the sample CD-ROM in a CD-ROM format which does not include any error detection code or any error correction code, the sample CD-ROM not having any uncorrectable error;

storing a second copy of the predetermined test data in a host computer;

using the CD-ROM player to read the predetermined test data from the sample CD-ROM by the CD-ROM player into the host computer to thereby generate a set of output data;

using the host computer to compare the second copy of the predetermined data with the set of output data to thereby evaluate the reading reliability of the CD-ROM player.

12. The method as recited in claim 11, wherein the sample CD-ROM has a plurality of sector addresses and the predetermined test data stored at each sector address is not stored at any other sector address.

13. The method as recited in claim 11, wherein the predetermined test data is a series of integer values, and each of the integer values increases at a constant difference corresponding to an increase of the respective sector address.

14. The method as recited in claim 11, wherein said CD-ROM format is MODE2 FORM2.

15. The method as recited in claim 11, wherein the host computer is a personal computer.

16. An apparatus for testing the reading reliability of a CD-ROM player, comprising:

a sample CD-ROM, predetermined test data being stored onto a plurality of sectors of the sample CD-ROM in a CD-ROM format which does not include any error detection code or any error correction code, the sample CD-ROM not having any uncorrectable error; and a testing bench adapted to receive a set of output data from the CD-ROM player, the testing bench comprising means for storing a second copy of the predetermined test data;

microprocessor means for receiving a third copy of the predetermined data from the storing means and for comparing the third copy of the predetermined test data with the set of output data to evaluate the reading reliability of the CD-ROM player.

17. The apparatus as recited in claim 16, wherein the sample CD-ROM has a plurality of sector addresses and the predetermined test data stored at each sector address is not stored at any other sector address.

18. The apparatus as recited in claim 16, wherein the predetermined test data is a series of integer values, and each of the integer values increases at a constant difference corresponding to an increase of the respective sector address.

19. The apparatus as recited in claim 16, wherein the format is MODE2 FORM2.

20. The apparatus as recited in claim 16, wherein the testing bench is a personal computers, the storing means is a hard-disk, and the microprocessor means is a central processing unit of the personal computer.

21. The method as recited in claim 1, wherein the predetermined test data is written on the sample CD-ROM using a second computer that is separate from said host computer and a CD-ROM recorder that is separate from said CD-ROM player.

22. The apparatus as recited in claim 6, wherein the predetermined test data is written on the sample CD-ROM using a second computer that is separate from said host computer and a CD-ROM recorder that is separate from said CD-ROM player.

* * * * *